Oct. 27, 1925.

W. COLCLOUGH

IRONING MACHINE

Filed April 17, 1922    5 Sheets-Sheet 1

1,559,075

INVENTOR
William Colclough
BY Brockett & Hyde
ATTORNEYS

Oct. 27, 1925.

W. COLCLOUGH

IRONING MACHINE

Filed April 17, 1922

1,559,075

5 Sheets-Sheet 3

INVENTOR
BY William Colclough
Brockett & Hyde
ATTORNEYS

Oct. 27, 1925.  
W. COLCLOUGH  
IRONING MACHINE  
Filed April 17, 1922  
1,559,075  
5 Sheets-Sheet 4

INVENTOR  
William Colclough  
BY Brockett & Hyde  
ATTORNEYS

Oct. 27, 1925.

W. COLCLOUGH 1,559,075

IRONING MACHINE

Filed April 17, 1922   5 Sheets-Sheet 5

INVENTOR
William Colclough
BY Brockett & Hyde
ATTORNEYS

Patented Oct. 27, 1925.

1,559,075

UNITED STATES PATENT OFFICE.

WILLIAM COLCLOUGH, OF NORWOOD, OHIO, ASSIGNOR TO THE AMERICAN LAUNDRY MACHINERY COMPANY, OF CINCINNATI, OHIO, A CORPORATION OF OHIO.

IRONING MACHINE.

Application filed April 17, 1922. Serial No. 553,368.

*To all whom it may concern:*

Be it known that I, WILLIAM COLCLOUGH, a citizen of the United States, residing at Norwood, in the county of Hamilton and State of Ohio, have invented certain new and useful Improvements in Ironing Machines, of which the following is a specification.

This invention relates to ironing machines and more especially to that class of ironing machines used in ironing small flat articles on one side of which it may be desirable to produce a highly finished or polished surface, such as collars and cuffs and the like.

The objects of this invention are to provide a machine of this kind for ironing collars, cuffs, etc. with means for removing from the work any moisture which is not removed while the work is being ironed and at the same time to set the finish of starched work; more particularly, to provide means for passing the work through a heated chamber upon leaving the ironing rolls; and furthermore, to embody such heating means as a part of the same machine structure.

Other objects of the present invention will be apparent from the following description and claims when considered together with the accompanying drawings.

Figure 1:
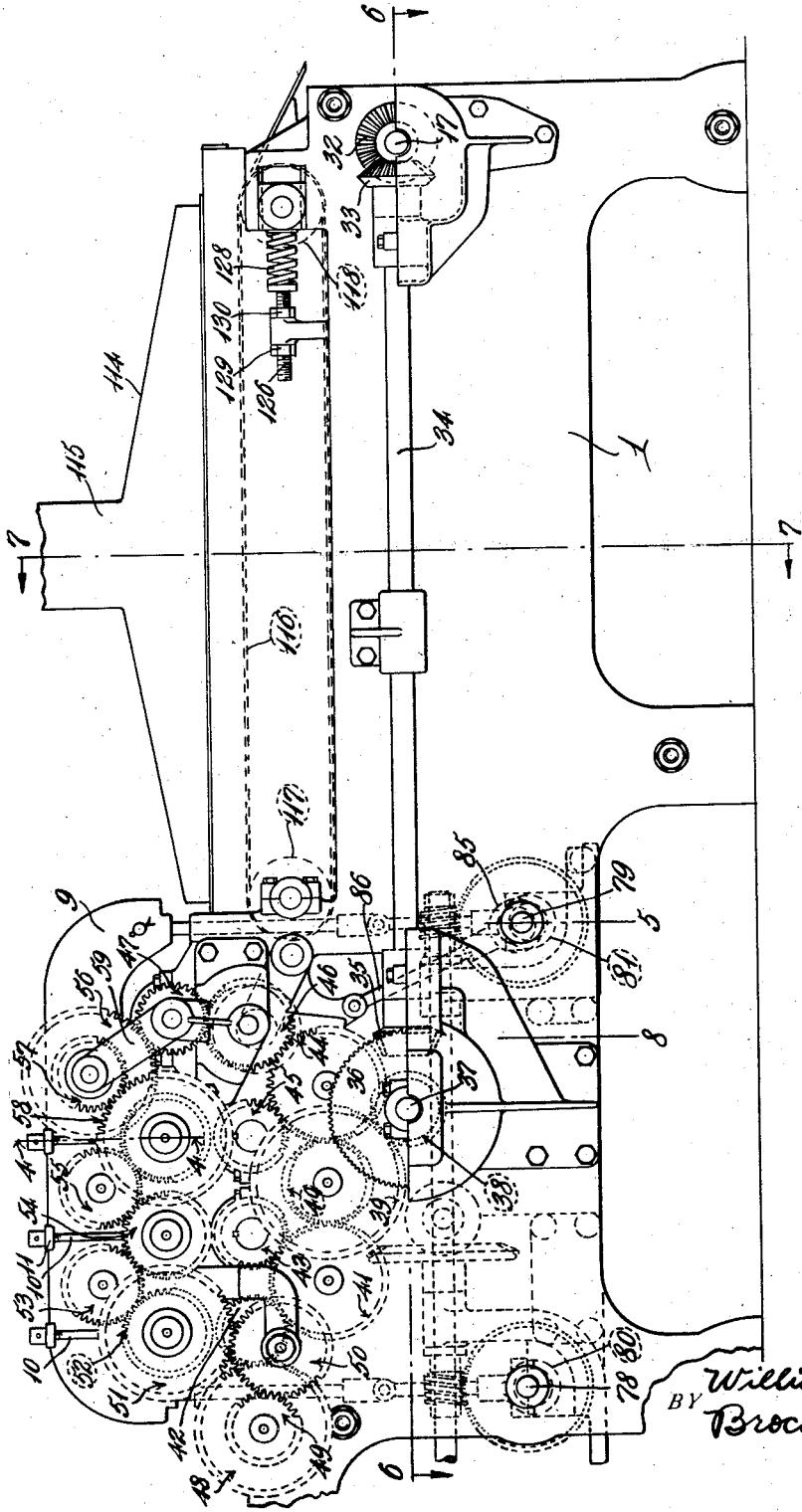
Figure 2:
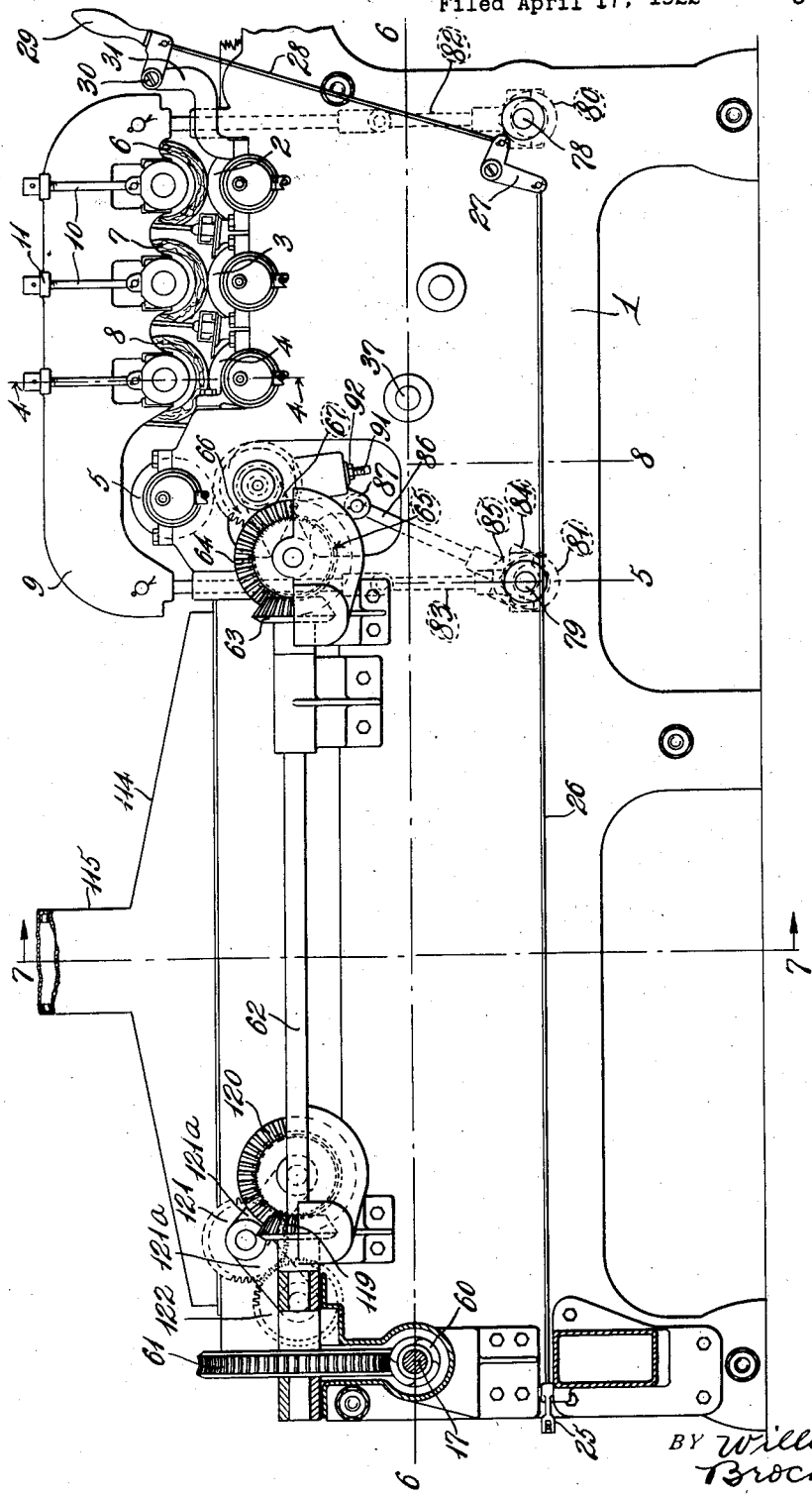
Figure 3:
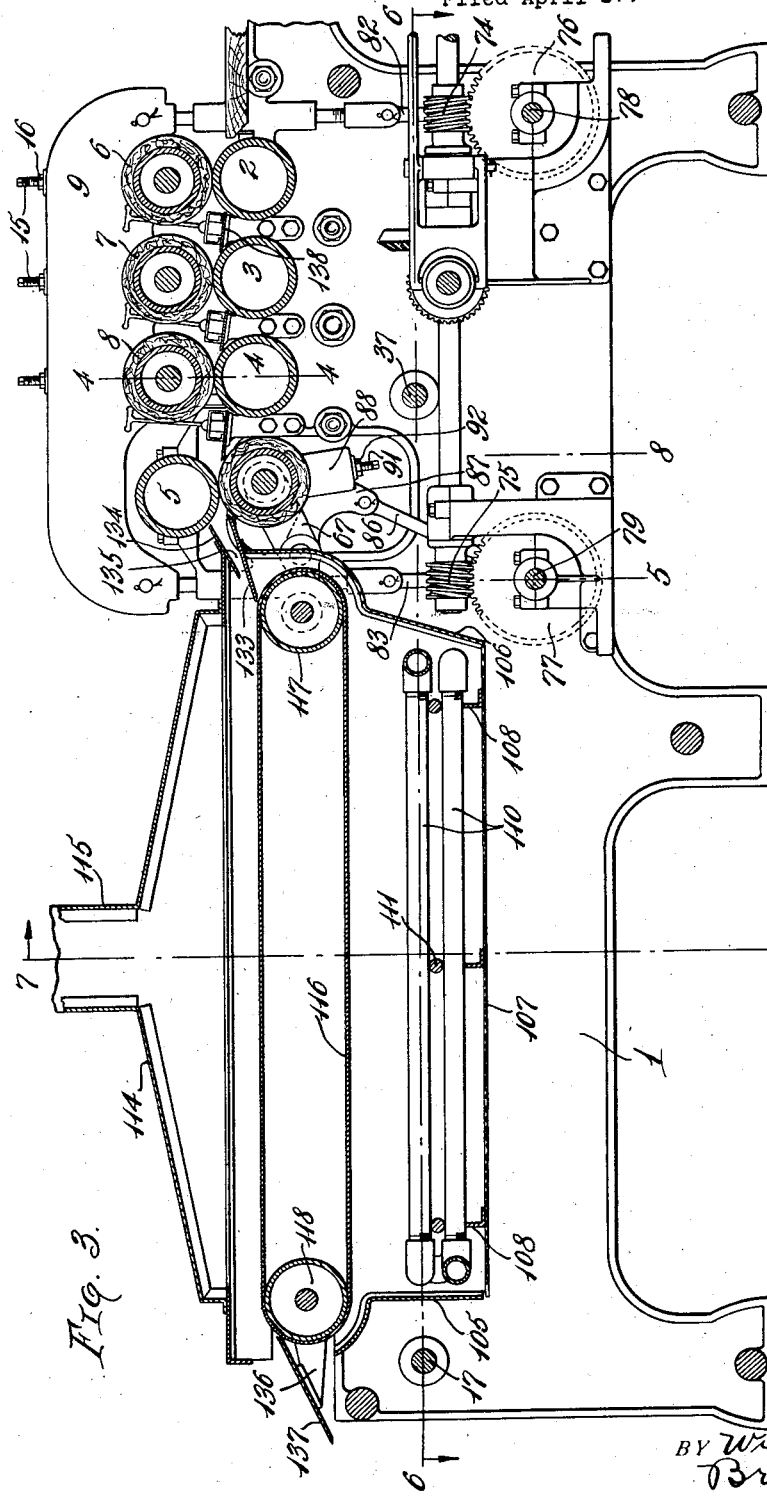
Figure 5:
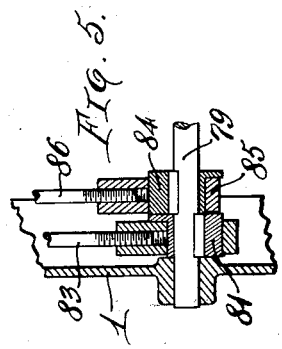
Figure 4:
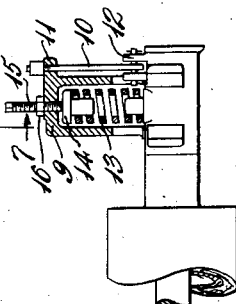
Figure 6:
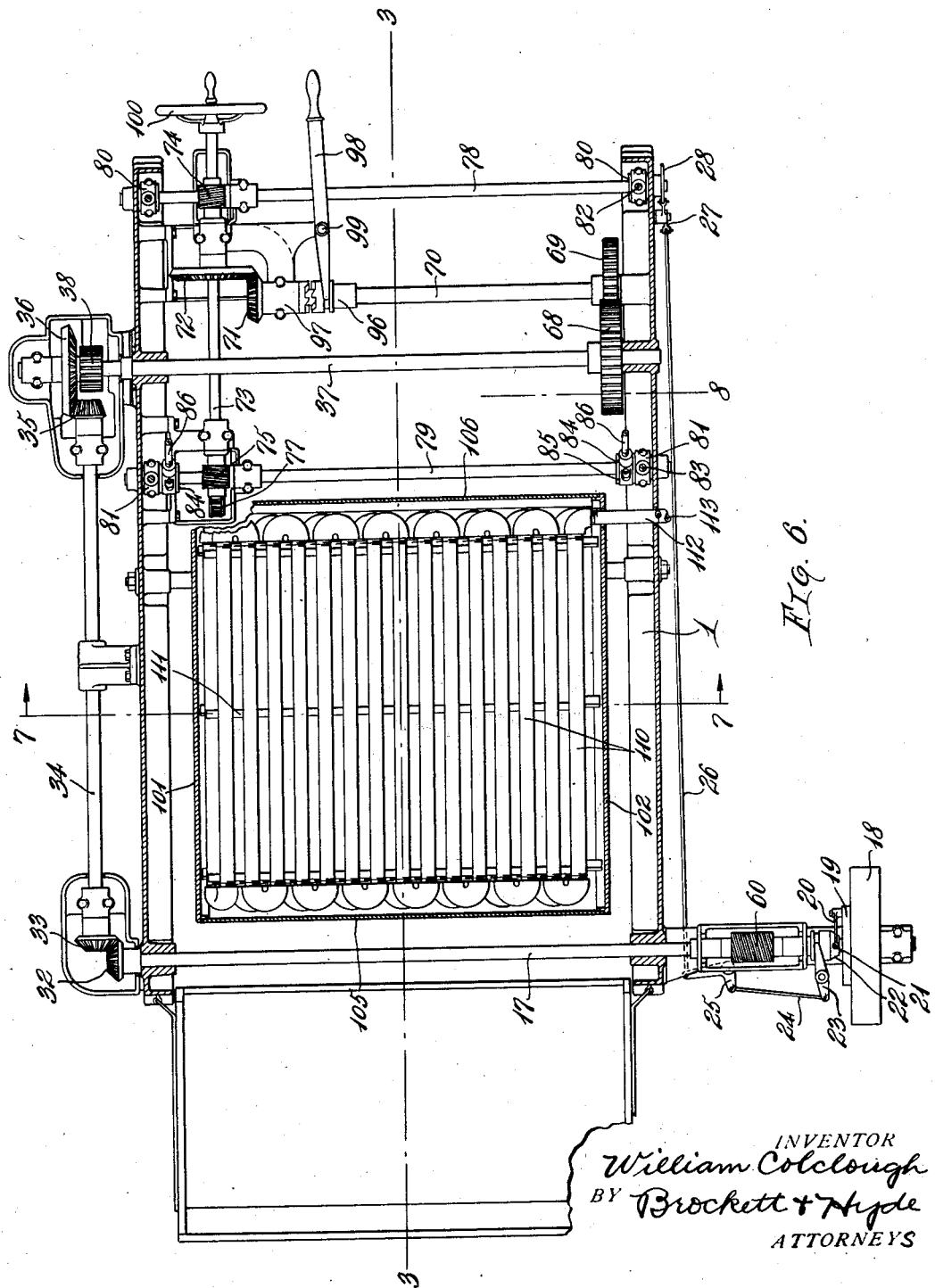
Figure 7:
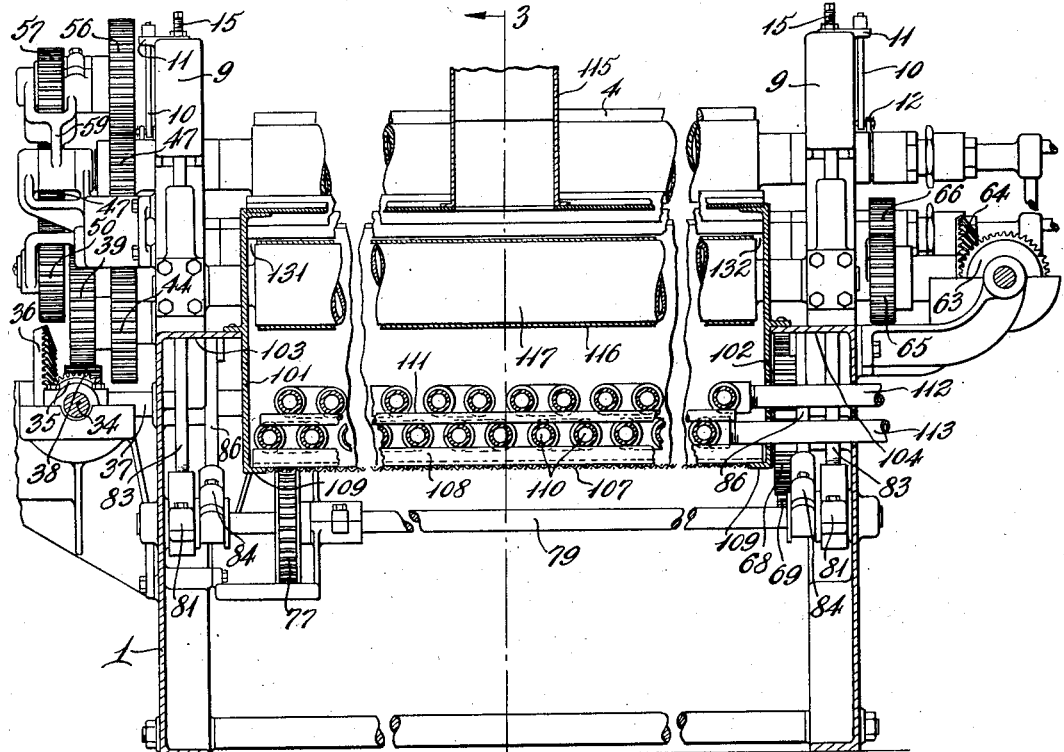
Figure 8:
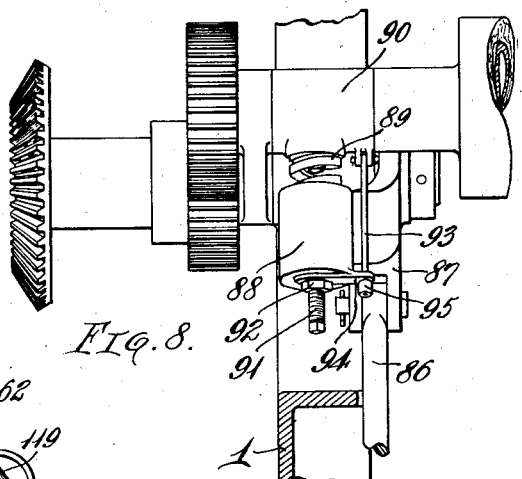
Figure 9:
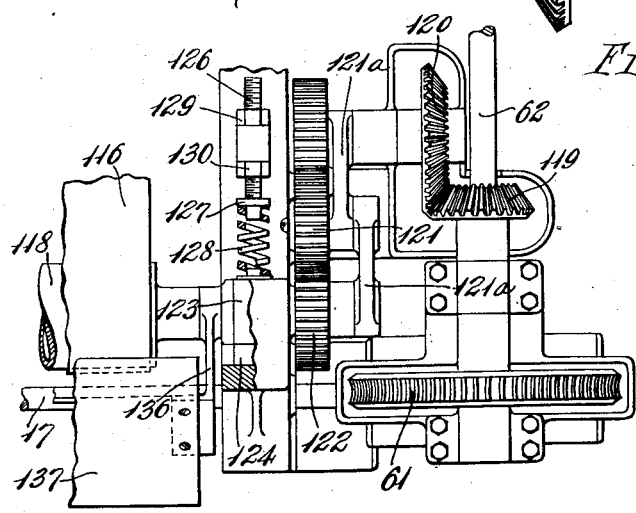

Fig. 1 is a side elevation of my improved machine; Fig. 2 is an elevation of my machine taken from the opposite side; Fig. 3 is a vertical longitudinal section taken on line 3—3 of Figs. 6 and 7; Fig. 4 is a transverse section of the presser bar taken on line 4—4 of Figs. 1, 2 and 3; Fig. 5 is a section showing the eccentrics on line 5—5 of Figs. 1, 2 and 3; Fig. 6 is a horizontal section taken on line 6—6 of Figs. 1, 2 and 3; Fig. 7 is a vertical transverse section taken on line 7—7 of Figs. 1, 2, 3 and 6; Fig. 8 is a detailed view taken on line 8—8 of Figs. 1, 2, 3 and 6 and shows the pressure device for the fourth padded roll; and Fig. 9 is a plan view with parts broken away showing the drive means for the endless conveyor.

In a general way my improved machine comprises a series of heated or ironing rolls and padded presser rolls between which the work is passed for the ironing operation, and also a heating chamber into which the work is introduced after being ironed and through which it is passed by means of an endless belt onto which the work is received after being ironed. The heating chamber is heated by means of steam coils situated below the belt and the work is automatically delivered from the machine after passing through the heating chamber. The endless belt is operated by the same source of power as is used for operation of the ironing and presser rolls so that the machine has a continuous automatic operation.

It is to be understood that suitable means are provided for mounting the gears, shafts, and levers in the frame of the machine and for also bracing the walls of the frame.

Mounted in the frame, indicated in a general way by reference numeral 1, are the first, second and third heated or ironing rolls 2, 3 and 4, respectively, which are arranged in substantially horizontal alignment as clearly indicated in the drawings. The fourth heated roll 5 is also mounted in the frame 1, but in a different horizontal plane from the other three heated rolls. Positioned above the first, second and third heated rolls are the first, second and third padded presser rolls 6, 7 and 8, whose bearings are slidably mounted in ways provided in pressure bars 9. The two pressure bars 9 extend along and above the sides of the machine structure and are adapted to be raised and lowered by manipulation of a mechanism to be later described. Fig. 4 shows the detailed mechanism by which the presser rolls are suspended from the pressure bars. This mechanism comprises hanger rods 10 which are suspended at their upper ends from outwardly projecting or overhanging flanges 11 on the pressure bars and whose lower ends are connected to the bearings of the presser rolls as indicated at 12. The pressure bars, which are of a hollow structure as shown in Fig. 4 afford a housing for springs 13 the lower ends of which bear against the bearings of the presser rolls while the upper ends are provided with the abutment 14 which can be adjusted by means of screw 15 and lock nut 16 so as to vary the tension of springs 13 and to thereby vary the degree of tension which it is desired to place upon the presser rolls.

The mechanism will now be described for the operation of the presser and heating rolls, the mechanism here shown being substantially the same as that shown in the copending application of Charles E. Waream, Serial No. 490,100 filed August 5, 1921. The shaft 17 is driven by pulley 18 which is operated from any suitable source of power and is thrown into and out of drive connection with pulley 18 by means of clutch 19. The arm 20 carried by the clutch is provided with set screw 21 for engagement by cone member 22 which in turn is manipulated by yoke member 23 whose ends engage in the annular groove of member 22. The yoke member 23 is operated through link 24, bell crank lever 25, connecting rod 26, bell crank lever 27 and lever 28 which is provided with handle 29 pivotally mounted at 30 upon bracket 31. The shaft 17 has fixed thereon bevel gear 32 meshing with companion bevel gear 33 which is fixed upon and drives shaft 34. The other end of shaft 34 has fixed thereon bevel gear 35 which drives bevel gear 36 fixedly mounted upon shaft 37. The shaft 37 has fixed thereon pinion 38 from which the several trains of gears are actuated for the operation of the presser and heated rolls.

Referring to Fig. 1, it will be seen that the first heated roll 2 is operated through pinions and gears 38, 39, 40, 41 and 42, the last named gear being carried by the shaft of the first heated roll. The second heated roll 3 is operated through the gears and pinions 38, 39, 40, 41 and 43, the last named gear being carried by the shaft of the second heated roll. The third heated roll 4 is operated through the gears and pinions 38, 39, 40, 44 and 45, the last named gear being carried by the shaft of the third heated roll. The fourth heated roll 5 is operated through gears and pinions 38, 39, 40, 44, 46 and 47, the last named gear being mounted upon the shaft of the fourth heated roll.

The first presser roll 6 is operated through gears and pinions 38, 39, 40, 41, 42, 48, 49, 50 and 51, the last named gear being mounted upon the shaft of the first presser roll. The shaft of presser roll 6 carries also gear 52 which through gear 53 drives gear 54 mounted upon the shaft of the second presser roll. The tumbler gear 55 meshes with gear 54 and also with part of the compound gear which is mounted upon the shaft of the third presser roll. The third presser roll is driven through the train of gears 38, 39, 40, 44, 46, 47, 56 and 57, the last named gear meshing with compound gear 58 carried by the shaft of the third presser roll. The compound gear 56, 57 is mounted upon arm 59 which is adapted to swing about the axis of the fourth heated roll 5 so as to maintain proper meshing engagement at all times between the gears. All of the gears and pinions are maintained at all times in proper meshing relation by means of the intermediate and tumbler gears and tumbler links.

The fourth presser roll is driven by the following mechanism. The worm gear 60, which is mounted upon and driven by shaft 17, meshes with gear 61 fixedly mounted upon shaft 62. The other end of shaft 62 carries bevel gear 63 which meshes with bevel gear 64 which in turn is mounted upon the stub shaft of gear 65. The last named gear meshes with and drives gear 66 which is mounted upon the shaft of the fourth presser roll. The fourth presser roll is mounted upon the arms 67 which are adapted for swinging movement about the axis of the gear 65 so as to permit adjustment of the presser roll toward and away from the fourth heated roll positioned thereabove. As viewed in Fig. 3 the first three presser rolls and the fourth heated roll are rotated clockwise, while the first three heated rolls and the fourth presser roll are rotated counter-clockwise, so as to feed the work towards the left.

The means will now be described for adjusting the presser rolls towards and away from the heated rolls. The shaft 37 has fixedly mounted thereupon gear 68 which meshes with gear 69 which in turn is fixed upon shaft 70. Fixed upon shaft 70 is bevel gear 71 which meshes with bevel gear 72 fixed upon shaft 73. The shaft 73 has fixed thereupon worm gears 74 and 75 which mesh with gears 76 and 77, respectively, the last named gears being fixed upon shafts 78 and 79. Carried near the ends of shafts 78 and 79 are cams 80 and 81 at both ends thereof for actuation of the cam straps which in turn are connected at their upper ends to rods 82 and 83, respectively. These rods are in turn connected through the clevises with the end portions of pressure bars 9 for adjustment of the same upon operation of the mechanism just now described.

Mounted upon shaft 79 just within cams 81 there are also provided cams 84 for actuation of cam straps 85 extending thereabout, these cam straps having operative connection with rods 86 which are connected at their upper ends to bracket 87. Upon manipulation of the adjusting means for the pressure bars, the first three presser rolls will be raised away from their heated rolls while the fourth presser roll will be lowered away from its heated roll, due to the arrangement of the cams upon shaft 79. The bracket 87 is provided with housing portion 88 which encloses spring 89 which in turn abuts at its one end the bearing 90 of the fourth presser roll while the other end of the spring has bearing engagement against the inner end of screw 91 which extends through the closed end of the housing 88. By means of screw 91 and nut 92 the tension upon spring 89 may be varied according to the degree of pressure desired for the presser roll in its engagement with the work. The hanger rod 93 is connected at its one end to bearing 90 and extends through the lug 94 provided on housing 88. The collar 95 on the free end of rod 93 prevents separation of the parts upon lowering of the presser roll.

Splined or keyed upon shaft 70 is clutch member 96 which is adapted for engagement with the companion clutch member 97 carried by bevel gear 71 which is freely mounted upon shaft 70. The clutch member 96 is actuated by means of lever 98 suitably pivoted at 99 to the frame so that upon throwing in clutch 96 the mechanism just now described for raising and lowering the pressure bars may be operated from the motor. The same adjustment of the pressure bars can also be had, when clutch 96 is disengaged, by manipulation of the wheel 100 which is mounted upon shaft 73. So that either manual or power operation of this adjusting mechanism may be had.

The means for drying the work and at the same time setting the finish to the starched goods will now be described. The heating chamber comprises walls 101 and 102 which are suitably secured to inwardly extending flanges 103 and 104 of the main frame and also end walls 105 and 106. The bottom of the heating chamber consists of the screen 107 and the angle bars 108 which are supported by inwardly extending flanges 109 which afford support for heating coils 110, these coils being spaced by means of rods 111. The inlet and outlet of the heating coils are indicated at 112 and 113, respectively. The heating chamber is provided at the top with hood 114 which has an outlet or discharge 115. The endless apron or conveyor belt 116 extends through the heating chamber about rolls 117 and 118 and is so positioned as to receive the work after it has passed the ironing and presser rolls and delivers the same in dry condition through the opening at the left hand end of the machine as viewed in Fig. 3. The roll 118 is driven by means of shaft 62 which has fixed thereon bevel gear 119, this bevel gear meshing in turn with bevel gear 120 which in turn meshes with tumbler gear 121, the last named gear driving gear 122 fixed on the shaft of roll 118. By means of tumbler links 121ª these gears are maintained in mesh for all adjusted positions of roll 118.

Referring to Fig. 9 of the drawings, it will be seen that bearing 123 of roll 118 is adapted for adjustable movement along tracks 124 on the frame so as to regulate the tension of apron 116. Adjustably mounted in lug 125 on the frame is screw rod 126 the one end of which is provided with bearing portion 127 providing abutment for one end of spring 128 while the other end of the spring abuts against a seat formed on bearing 123. By means of nuts 129 and 130 the tension on springs 128 can be set at variable degrees. It will also be seen that in case the apron should tend to creep across, that is longitudinally of, rolls 117 and 118, correction can be made by proper adjustment of the bearings at the two ends of the roll 118, that is, by different adjustments at the two ends so as to vary the angle of roll 118 with respect to the path of travel of the apron.

The air upon entering the heating chamber through the perforate bottom will be heated as its passes the coils and will pass upwardly to heat the conveyor belt. This air then escapes past the two sides of the conveyor through the passages indicated at 131 and 132 and is eventually discharged through outlet 115. The work as it passes over the fourth presser roll will be delivered onto the apron by means of doffer plate 133 suitably mounted on the wall of the heating chamber. A guide plate 134 is also mounted on the wall of the heating chamber so as to provide together with doffer plate 133 a delivery chute 135 which will guide the work onto the endless apron. Mounted upon the bearings of roll 118 are bracket arms 136 which support doffer plate 137 for delivering the work from the apron. The doffer plates 138 are also provided between the rolls so as to strip the work from the one roll and direct it onto the next.

Thus I have provided a unitary machine structure with means for passing the work through heated and presser rolls and then delivering the same onto a conveyor belt which carries it through a heating chamber and delivers it from the other end of the machine.

Notably among the advantages flowing from this particular machine structure is that residing in the fact that any moisture remaining in the work after the ironing operation will be removed by its passage through the heating chamber before being discharged from the machine. Furthermore, in the case of starched goods, the finish will be set as it passes through the heating chamber, the finish in such class of goods being more effective while the work is still in a moist condition.

Furthermore, the collars and cuffs for instance, for which this improved machine is particularly adapted, are maintained in flat condition throughout the entire ironing and drying operations, and the condition of such starched work is thereby greatly improved. The drying operation is also greatly facilitated by direct exposure of the work to the discharge outlet.

Having described my invention, I claim:

1. An ironing machine structure, comprising a drying chamber, ironing rolls outside of said chamber, means for conveying the work after it has been ironed by said rolls through the drying chamber for the drying operation, heating means within said chamber below said conveying means, and air discharge means having connection with said chamber from above said conveying means for discharging the moisture laden air therefrom.

2. An ironing machine structure, comprising a drying chamber, ironing rolls outside of said chamber, means for conveying the work after it has been ironed by said rolls through the drying chamber for the drying operation, heating means within said chamber below said conveying means, and air discharge means having connection with said chamber from above said conveying means and through substantially the entire extent thereof for discharging the moisture laden air therefrom.

In testimony whereof I hereby affix my signature.

WILLIAM COLCLOUGH.